United States Patent [19]
de Vries et al.

[11] Patent Number: 6,148,304
[45] Date of Patent: Nov. 14, 2000

[54] NAVIGATING MULTIMEDIA CONTENT USING A GRAPHICAL USER INTERFACE WITH MULTIPLE DISPLAY REGIONS

[75] Inventors: Pierre de Vries, Kirkland; Holly Serdy, Redmond, both of Wash.

[73] Assignee: Microsoft Corporation, Redmond, Wash.

[21] Appl. No.: 08/820,158

[22] Filed: Mar. 19, 1997

[51] Int. Cl.[7] .................................................. G06F 17/21
[52] U.S. Cl. .................................... 707/104; 707/2; 707/4
[58] Field of Search ................................ 345/302, 333, 345/346; 706/11; 705/14; 395/200.32; 707/104, 10, 516, 4, 2; 386/96; 434/316

[56] References Cited

U.S. PATENT DOCUMENTS

| | | | |
|---|---|---|---|
| 5,559,942 | 9/1996 | Gough et al. | 345/346 |
| 5,664,227 | 9/1997 | Mauldin et al. | 707/516 |
| 5,794,210 | 8/1998 | Goldhaber et al. | 705/4 |
| 5,794,249 | 8/1998 | Orsolini et al. | 707/104 |
| 5,799,292 | 8/1998 | Hekmatpour | 706/11 |
| 5,835,667 | 11/1998 | Wactlar et al. | 386/96 |
| 5,838,906 | 11/1998 | Doyle et al. | 395/200.32 |
| 5,870,755 | 2/1999 | Stevens et al. | 707/104 |
| 5,873,735 | 1/1999 | Yamada et al. | 434/316 |
| 5,930,787 | 7/1999 | Minakuchi et al. | 707/4 |
| 5,956,716 | 9/1999 | Kenner et al. | 707/10 |
| 5,995,941 | 11/1999 | Maquire et al. | 705/10 |

OTHER PUBLICATIONS

Infomedia—Internet Reference HTTP://www.infomedia.cs.cmu.edu, Dec. 20, 1996.

*Primary Examiner*—James P. Trammell
*Assistant Examiner*—John Leonard Young
*Attorney, Agent, or Firm*—Lee & Hayes, PLLC

[57] ABSTRACT

Described herein is a user interface for reviewing time-correlated multimedia content. The user interface has three display regions, configured to display three different content sequences of different types, all relating to a specific event. The content sequences are time-correlated to each other. However, a user can independently scroll through individual content sequences. When the user selects a particular place in one content sequence, however, the other content sequences are updated to show corresponding places. The user can begin playback of the multimedia content, during which all of the content sequences are rendered in time with each other.

41 Claims, 3 Drawing Sheets

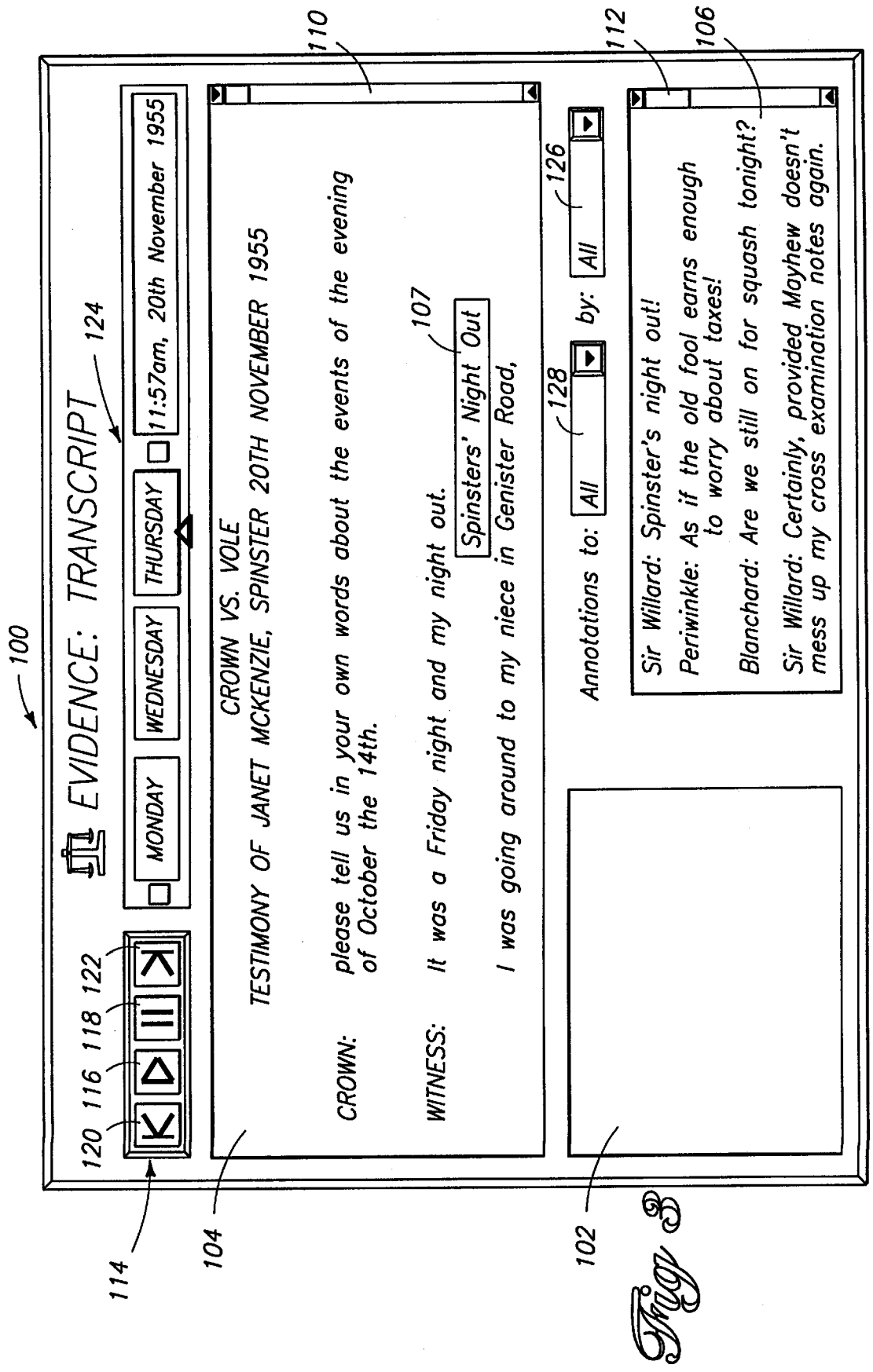

NAVIGATING MULTIMEDIA CONTENT USING A GRAPHICAL USER INTERFACE WITH MULTIPLE DISPLAY REGIONS

TECHNICAL FIELD

This invention relates to apparatus and methods for recording and reviewing the content of meetings involving a plurality of people.

BACKGROUND OF THE INVENTION

Current computer technology enables users to access large bodies of audio, video, and textual information. However, streaming media such as audio and video are hard to skim. Thus, it is sometimes very time-consuming to utilize large libraries of video and audio information.

Attempts are being made to remedy this problem. Such attempts have focused primarily on preparing textual transcripts of video and audio archives, and time-correlating such transcripts to the video and audio content. Using this technology, a user can perform a text search using conventional text searching techniques. When sought-for text is found in a transcript, the user can access and play the audio or video associated with the text.

Another technique that can be used in some cases to skim textual materials is to make use of footnoting features in modern word processors such as Microsoft® Word 97, available from Microsoft Corporation. This word processor can be configured to display the main text of a document in a primary window and the document's footnotes in a secondary, footnote window. A user can move from one footnote to another in the footnote window. Selecting a particular footnote in the footnote window causes the text in the primary window to scroll to the location of the footnote.

While efforts such as these are beneficial, they do not satisfactorily address the problem of finding and reviewing archived video. One problem with the prior art methods is that a person must have some prior idea of the specific video topics being sought. In many situations, however, a person may need simply to skim through multimedia content to determine whether it contains anything of interest. Present multimedia indexing methods do not easily allow this.

SUMMARY OF THE INVENTION

The invention described below is a way of recording and reviewing a specific event such as a meeting attended by a number of people. When reviewing a meeting, it might be desired to view a transcript in addition to a video of the meeting. In addition, it might be desired to have index entries arranged for easy skimming, configured in such a way as to allow the user to quickly jump to any place in the corresponding transcript and/or video.

The invention provides a user interface having at least three display regions. One display region is used for displaying primary multimedia content such as a video of a meeting. Another region is used for displaying supplementary material such as a transcript of the meeting. A third region is used for displaying index entries relating to the meeting. In the described embodiment of the invention, the index entries are annotations made by meeting participants to passages in the transcript during the meeting.

The user interface is configured to allow a user to scroll through the content by moving through the annotations or index entries. The user can initiate playback at anytime. During playback, the three different types of information are kept in time with each other, so that the transcript and the index entries always correspond to the current position of the video stream.

BRIEF DESCRIPTION OF THE DRAWINGS

FIG. 3 shows a user interface in accordance with one embodiment of the invention.

DETAILED DESCRIPTION

Figure 1:
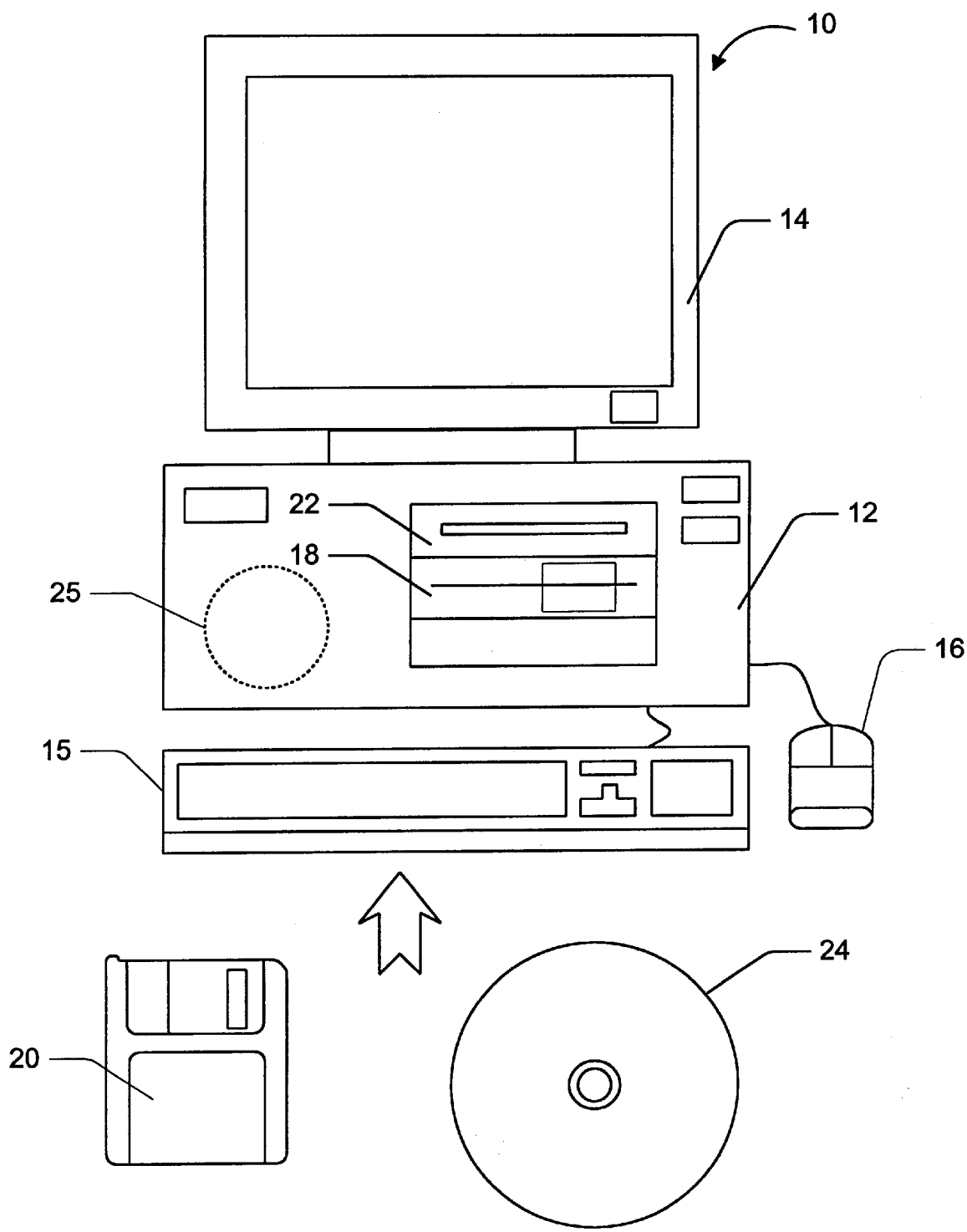
FIG. 1 shows a computer system in accordance with the invention.

FIG. 1 shows a computer system 10 in accordance with the invention, which implements a user interface for accessing and reviewing at least three time-correlated content sequences. Each content sequence comprises multimedia content such as video, audio/video, sequences of still images, and/or textual information. In the embodiment described herein, the multimedia content relates to a meeting or presentation in which a plurality of people participate.

Computer system 10 in the illustrated embodiment is a conventional desktop IBM-compatible computer. System 10 has a central processing unit (CPU) 12, a display monitor 14 with an associated display surface, a keyboard 15, and a mouse 16. The computer 10 also utilizes one or more multimedia content sources, including a computer-readable storage medium such as a floppy memory diskette 20 and a CD-ROM 24 in conjunction with a floppy disk drive 18 and a CD-ROM drive 22. A speaker 25 is used in conjunction with appropriate interface circuitry for audio output. Content sources might also comprise network or Internet resources. Computer system 10 is operably connected to receive and display the three time-correlated continuous content sequences mentioned above from the one or more multimedia content sources.

Figure 2:
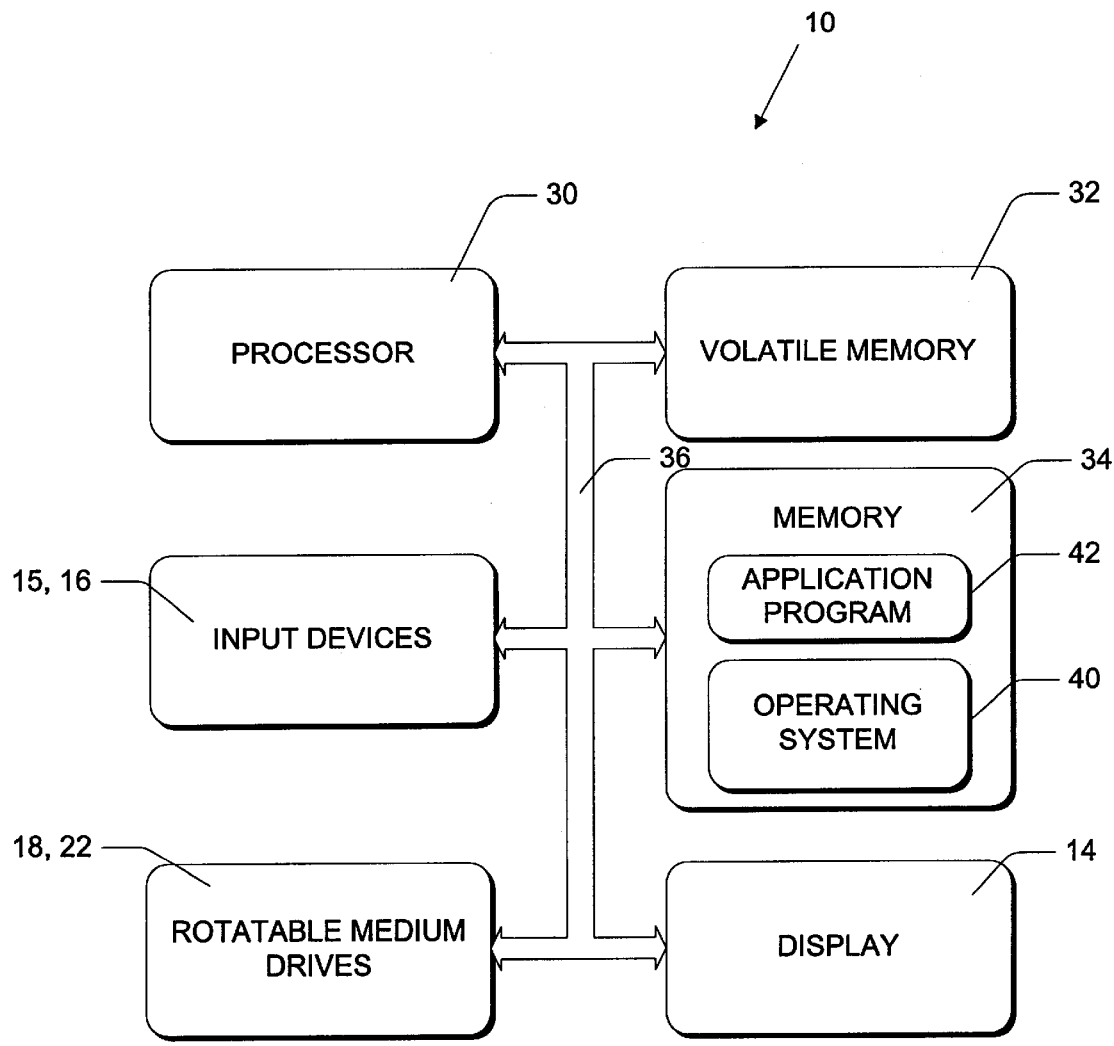
FIG. 2 is a block diagram of the computer system of FIG. 1.

FIG. 2 shows a functional block diagram of computer system 10. System 10 has a processor 30 and one or more additional forms of computer-readable storage media. Specifically, system 10 includes a volatile memory 32 (e.g., RAM), and a non-volatile memory 34 interconnected by an internal bus 36. The non-volatile memory 34 can be implemented as integrated circuit chips (e.g., ROM, EEPROM), disk drive(s) (e.g., floppy, optical, hard), or a combination of both.

The display 14 is connected to the bus 36 through appropriate hardware interface drivers (not shown). Additionally, the input devices 15, 16 are connected to supply data to the bus 36 via appropriate I/O ports. Floppy drive 18 and CD-ROM drive 22 are also connected through bus 36.

The computer 10 runs an operating system 40 that supports multiple applications. The operating system 40 is stored on the non-volatile memory 34 and executes on the processor 30. The operating system is preferably a multi-tasking operating system that allows simultaneous execution of multiple applications, although aspects of this invention may be implemented using a single-tasking operating system. The operating system employs a graphical user interface windowing environment. One preferred operating system is a Windows® brand operating system sold by Microsoft Corporation, such as Windows® 95 or Windows NT® or other derivative versions of Windows®. However, other operating systems that provide windowing environments may be employed, such as the Macintosh OS from Apple Corporation and the OS/2 Presentation Manager from IBM.

A computer application 42 is stored in the non-volatile memory 34. When the computer application 42 is activated, processor 30 reads instructions from non-volatile memory into volatile memory and executes the instructions to perform steps which will be described below. The application 42 can be loaded into the memory 34 from an internal hard disk, floppy diskette 20, CD-ROM 24, or alternatively, downloaded from a network via a network port (not shown).

Although the invention is described within the illustrated context of a familiar desktop computer, aspects of the invention might also be employed in other forms of computing devices, such as laptop computers, hand-held computers, set-top boxes, game devices, and other types of computing and entertainment devices. Generally, there are three different types of content sequences utilized in the preferred embodiment of the invention: a video or audio/video stream, a sequence or stream of material that is supplementary to the video stream, and a plurality of index entries. In the context of a meeting, the video stream shows the primary speaker at the meeting or each speaker he or she speaks. Supplementary material preferably comprises a textual transcript of the meeting. Index entries preferably comprise annotations made by meeting participants during the meeting.

The audio/video stream is captured using a video camera, and converted to a computer-readable format using conventional means. Audio/video data is preferably stored in any one of a number of standard compressed formats such as a standard JPEG or MPEG format. Such formats typically have some sort of inherent or explicit time-stamping, indicating the relative presentation times of individual video frames relative to each other or to a start time.

The textual transcript can be prepared in different ways. For instance, the transcript can be prepared by a transcriptionist. In this case, the transcriptionist not only prepares a written transcript corresponding to the video stream, but also inserts time values or sequence indicators periodically into the transcript. The time values correspond in some way to the timing of frames within the video stream, so that the transcript can be easily time-correlated with the video stream. To accomplish this, the transcriptionist might transcribe while viewing the video stream in conjunction with a displayed counter that shows the current relative time from the beginning of the video stream. Thus, at the beginning of each sentence the transcriptionist inserts the relative time in brackets, such as "[1:05:56]" (using an hour:minute:second format). Alternatively, time values might be entered by frame number or some other value indicating a correspondence with the video stream. This process can be automated to some degree by using an automated speech recognition system. When prepared in this manner, the supplementary material can be correlated in time to different places in the video stream. Alternatively, a time-stamp can be automatically added to the transcript every time a new paragraph is begun, at regular intervals, or at the end of every sentence.

Index entries can be prepared in a similar manner. In one example, index entries might comprise summarizing entries prepared after the meeting. In another example, index entries might comprise merely the initial phrases from sentences found in the transcript. Additionally, index entries could include links or pointers to other, non-time-correlated parts of the multi-media record of the meeting, e.g. other index entries or content occurring at different times, or to other textual or multi-media documents such as Internet resources. As mentioned above, annotations are another desirable form of index entries. Annotations might be made by speaking into private microphones during the meeting. Comments would be recorded and transcribed later. More preferably, however, meeting participants are provided with laptop or pen-based computers that are networked using communications software or group collaboration software such as Microsoft's NetMeeting™ software. Participants can make annotations as the meeting progresses. The annotations are time-stamped with values relative to the start of the meeting, so that the annotations can be time-correlated with different places in the transcript and the video stream.

While it is desirable in many cases to record annotations for a plurality of meeting participants, in some cases it might be worthwhile to record just the comments of a single attendee. In this case, the attendee can simply type comments into a word processor while manually adding time stamps (using the actual time of day). To automate this procedure slightly, a macro program can be prepared to insert time stamps into the attendee's document either at the attendee's command or at periodic intervals such as thirty seconds or a minute, or whenever the person is typing. Such time stamps can be in textual format, such as the bracketed hour:minute:second format mentioned above.

The annotations and index entries can be stored in a conventional textual format. However, it may alternatively be desired to process the textual content and to convert the time-stamping described above into other formats that are convenient for synchronizing the different content sequences. Different methods and techniques for synchronizing different types of multimedia content can be found in the prior art.

Other types of information might alternatively be used. For instance, the supplementary material might be replaced by a series of computer-generated presentation images used by a presenter during a meeting—generated, for example, by presentation software such as Microsoft's PowerPoint® software. Such images might be obtained by a live feed or the presenter could simply deliver a file containing the images after the presentation. Also, thumbnails (small versions) of the images might be used as index entries. Alternatively, the video stream might be replaced by the presentation images, with the supplementary material comprising a textual transcript.

FIG. 3 shows a user interface 100 as implemented by computer system 10 in accordance with one embodiment of the invention. The user interface is implemented as an application program written in a conventional programming language, using the extensive built-in graphic capabilities of the Windows® operating environment. The application program is typically stored on and executes from some type of computer-readable storage medium such as discussed above.

User interface 100 has at least three different display regions or windows, labeled in this example with reference numerals 102, 104, and 106. Each display region is configured to display at least a portion of a corresponding one of the time-correlated content sequences. In this case, window 102 is configured by processor 30 to render the video stream (not illustrated because of drawing limitations). Window 104 is configured to render the supplemental materials. In this embodiment, the supplemental materials comprise the textual transcript mentioned above. In other embodiments, the supplemental materials might comprise other content, such as presentation images that are also mentioned above. Window 106 is configured to render or display index entries. In the illustrated embodiment, the index entries are annotations, although they could also be initial phrases or thumbnail images as mentioned above. Index entries are optionally also shown in window 104 along with the supplementary materials (notice the annotation labeled with reference numeral 107, for example).

Initially, static portions of the three time-correlated content sequences are displayed in their corresponding windows on the display surface of display monitor 14. In the example, a still frame from the video stream is displayed in window 102. A corresponding portion of a transcript is shown in window 104. Corresponding index entries are shown in window 106.

Controls are provided to allow a user or reviewer to scroll through the supplemental materials in window 104 and the index entries in window 106. Specifically, conventional Windows® scroll-bars 110 and 112 are provided alongside windows 104 and 106, respectively. Scrolling in one window has no effect on the other windows. However, the windows are responsive to user selection of a particular place in one of the content sequences to display correlating places in the other content sequences. For example, selecting a particular index in window 106 entry causes windows 102 and 104 to display a corresponding frame from the video stream and the corresponding part of the transcript. In the Windows® environment described herein, the selection is accomplished by moving a pointer to the targeted text or other material using a mouse, and then pressing a mouse button. This is referred to as "clicking on" the targeted material.

In the example, a user might initially want to scroll through annotations to find pertinent parts of a meeting. After finding an interesting annotation, the user would select it by clicking on it. In response, the other two windows would adjust themselves to display the time-correlated video frame and transcript portion.

Alternatively, the user might begin reading through the transcript. Upon finding an interesting portion, the user could click on that portion, whereupon the annotation and video windows would update to show corresponding parts of the video and annotations.

User interface 100 also includes a transport control 114. The transport control includes buttons that can be selected to control playing of the video stream and other content sequences. Windows 104, 106, and 108 of the user interface are responsive to a play button 116 to play the video stream and the other content sequences in time with each other. The term "play" is used to indicate that the video is rendered continuously. The term is also used to indicate that the material in the other windows is presented linearly. The phrase "in time with each other" indicates that the three types of content are correlated in time with each other, so that corresponding portions of the content sequences are displayed at corresponding times as they are played. Playing begins at whatever place in the content sequences has been selected by the user, or at the closest point at which it is practical to begin playback within the constraints of the particular encoding scheme of the video content. If a user selects a particular place in one of the content sequences, playing begins at that place and at the correlating places in the other content sequences.

Transport control 114 also includes a pause button 118 to pause playing of the content sequences, a fast-reverse button 120, and a fast-forward button 122. When fast-forwarding or fast-reversing, the time-correlation between the displayed content sequences is maintained. Thus, at any time during playback, all of the content windows are synchronized with each other.

Other controls are optionally provided. For instance, a timeline control 124 is provided, showing the time at which activities depicted in the content windows occurred. This control provides another way for a user to scroll through content. When this control is manipulated, all three of the content sequences are adjusted to reflect the time selected by a user.

Filters are also optionally provided for the index window, depending on the nature of index entries used. In the example of FIG. 3, each index entry is made by a particular person. Accordingly, the user can use a filter drop-down control 126 to select one person-only annotations by that person will be visible in window 106. In the example shown, the user has selected "all", so that all annotations will be shown.

A second filter drop-down control 128 is also included in the example user interface, allowing a user to view only those annotations that are directed "to" a particular person.

While the invention has been described primarily in terms of its visible features, the invention also includes the steps used to implement such features. Such steps include the steps used to record a meeting for subsequent review, and the steps used to present the meeting in the format already described.

Preferred steps in accordance with the invention include recording a meeting as an audio/video sequence and transcribing a textual transcript of the meeting. Preferred steps further comprise creating index entries relating to the meeting. In the example given above, the index entries are textual annotations made by meeting participants during the meeting.

A further step comprises time-correlating the audio/video sequence, the textual transcript, and the index entries with each other. This can be accomplished as described above, with a rudimentary form of time-stamping. More elegant schemes might also be devised for inter-correlating the content.

Further steps include simultaneously displaying static portions of the audio/video sequence, the textual transcript, and the index entries, respectively, in three different windows or window frames. In response to user selection of a particular place in the textual transcript or the index entries, a step is performed of displaying correlating places in the audio/video sequence, the textual transcript, and the index entries. In response to a user command, a further step is performed of playing the audio/video sequence, the textual transcript, and the index entries in time with each other. The playing begins at the particular place that has been selected by the user.

The invention provides a convenient way to record and replay meetings and other events, while also allowing a user to easily skim through a variety of multimedia materials. This is accomplished within a user interface using components that are familiar and easy to use.

In compliance with the statute, the invention has been described in language more or less specific as to structural and methodical features. It is to be understood, however, that the invention is not limited to the specific features described, since the means herein disclosed comprise preferred forms of putting the invention into effect. The invention is, therefore, claimed in any of its forms or modifications within the proper scope of the appended claims appropriately interpreted in accordance with the doctrine of equivalents.

What is claimed is:

1. A user interface for reviewing at least three time-correlated content sequences, comprising:

at least three different display regions;

each display region being configured to display at least a portion of a corresponding one of said time-correlated content sequences;

each display region being responsive to user selection of a particular place in the corresponding content sequence to display a time-correlated place in each of the other content sequences.

2. A user interface as recited in claim 1, wherein:

said one of the content sequences comprises a plurality of index entries;

the display regions are responsive to selecting a particular index entry from said one content sequence to display portions of said other content sequences that are time-correlated with said particular index entry.

3. A user interface as recited in claim 1, wherein:

said one of the content sequences comprises a plurality of index entries;

the index entries contain links to non-time-correlated places in the content sequences.

4. A user interface as recited in claim 1, wherein:

said one of the content sequences comprises a plurality of index entries;

the index entries contain links to external resources.

5. A user interface as recited in claim 1, wherein:

at least a first one of the content sequences is a video stream;

the display regions being responsive to a user command to play the video stream and the second and third ones of the content sequences in time with each other.

6. A user interface as recited in claim 1 wherein:

a first of the content sequences comprises a video stream;

a first of the display regions is configured to render the video stream;

a second of the content sequences comprises a textual transcript corresponding to the video stream;

a second of the display regions is configured to display the textual transcript;

a third of the content sequences comprises a plurality of index entries corresponding to the video stream and the textual transcript;

a third of the display regions is configured to display the index entries.

7. A user interface as recited in claim 1 wherein:

a first of the content sequences comprises a series of graphics images for use in a presentation;

a first of the display regions is configured to render the graphics images;

a second of the content sequences comprises a textual transcript of a presentation given in conjunction with the graphics images;

a second of the display regions is configured to display the textual transcript;

a third of the content sequences comprises a plurality of thumbnail images corresponding to the graphics images;

a third of the display regions is configured to display the thumbnail images.

8. A user interface for reviewing time-correlated multimedia content, comprising:

a first display region configured to render a first content sequence comprising a video stream;

a second display region configured to display a second content sequence comprising a plurality of index entries;

a third display region configured to display a third content sequence comprising material that is supplementary to the video stream;

the video stream, the index entries and the supplementary material being time-correlated with each other; and the display regions being responsive to user selection of a particular index entry to display a time-correlated place in the video stream and a time-correlated place in the supplementary material.

9. A user interface as recited in claim 8, wherein the supplementary material comprises a textual transcript corresponding to the video stream.

10. A user interface as recited in claim 8, wherein:

the supplementary material comprises a textual transcript corresponding to the video stream;

the index entries comprise annotations corresponding to the video stream.

11. A user interface as recited in claim 8, wherein the display regions are responsive to a user command to play the video stream and the second and third content sequences in time with each other.

12. A user interface as recited in claim 8, wherein the index entries comprise annotations corresponding to the video stream.

13. A user interface as recited in claim 8, wherein:

the supplementary material comprises a textual transcript corresponding to the video stream;

the index entries comprises initial phrases from the transcript.

14. A user interface as recited in claim 8, wherein:

the supplementary material comprises graphics images used in conjunction with a presentation;

the index entries comprise parts of a transcript of the presentation.

15. A user interface as recited in claim 8, wherein:

the supplementary material comprises graphics images used in conjunction with a presentation;

the index entries comprise initial phrases from a transcript of the presentation.

16. A user interface for reviewing time-correlated multimedia content, comprising:

a display device having a display surface;

one or more multimedia content sources;

a processor operable connected to receive and display at least three time-correlated content sequences from the one or more multimedia content source;

the processor being configured to perform the following:

displaying static portions of the three time-correlated content sequences, respectively, in corresponding windows on the display surface, each static portion displayed being time-correlated with each of the other static portions displayed;

in response to user selection of a particular place in one of the content sequences, displaying correlating places in the other content sequences; and in response to a user command, playing the time-correlated content sequences in time with each other.

17. A user interface in accordance with claim 16, wherein the playing begins at said particular place in said one of the content sequences and at said correlating places in the other content sequences.

18. A user interface in accordance with claim 16, wherein said particular one of the content sequences comprises a plurality of index entries.

19. A user interface in accordance with claim 16, wherein at least one of said other content sequences is a video stream.

20. A user interface in accordance with claim 16, wherein:

said particular one of the content sequences comprises a plurality of index entries;

at least one of said other content sequences is a video stream.

21. A user interface in accordance with claim 16, wherein:
at least one of said other content sequences is a video stream;
said particular one of the content sequences comprises a plurality of annotations corresponding to the video stream;
at least one of said other content sequences is a textual transcript corresponding to the video stream.

22. A user interface in accordance with claim 16, wherein:
said particular one of the content sequences comprises a plurality of index entries;
at least one of said other content sequences is a video stream;
at least one of said other content sequences is a textual transcript corresponding to the video stream.

23. A method of reviewing time-correlated multimedia content, comprising the following steps:
displaying at least a portion of a first time-correlated multimedia content sequence in a first window on a display surface;
displaying at least a portion of a second time-correlated multimedia content sequence in a second window on a display surface;
displaying at least a portion of a third time-correlated multimedia content sequence in a third window on a display surface; and
in response to user selection of a particular place in one of the multimedia content sequence, displacing a time-correlating place in each of the other multimedia content sequence.

24. A method as recited in claim 23, wherein said particular one of the content sequences comprises a plurality of index entries.

25. A method as recited in claim 23, wherein at least one of said other content sequences is a video stream.

26. A method as recited in claim 23, wherein:
said particular one of the content sequences comprises a plurality of index entries;
at least one of said other content sequences is a video stream;
at least one of said other content sequences is a textual transcript corresponding to the video stream.

27. A method of reviewing time-correlated multimedia content, comprising the following steps:
displaying portions of at least three time-correlated content sequences, respectively, in corresponding windows on a display surface;
in response to user selection of a particular place in one of the content sequences, displaying correlating places in the other content sequences;
in response to a user command, playing the time-correlated content sequences in time with each other.

28. A method as recited in claim 27, wherein the playing begins at said particular place in said one of the content sequences and at said correlating places in the other content sequences.

29. A method as recited in claim 27, wherein said particular one of the content sequences comprises a plurality of index entries.

30. A method as recited in claim 27, wherein at least one of said other content sequences is a video stream.

31. A method as recited in claim 27, wherein:
said particular one of the content sequences comprises a plurality of index entries;
at least one of said other content sequences is a video stream;
at least one of said other content sequences is a textual transcript corresponding to the video stream.

32. A computer-readable storage medium containing computer-executable instructions for performing steps comprising:
displaying portions of at least three time-correlated content sequences, respectively, in corresponding windows on a display surface;
in response to user selection of a particular place in one of the content sequences, displaying correlating places in the other content sequences;
in response to a user command, playing the time-correlated content sequences in time with each other.

33. A computer-readable storage medium as recited in claim 32, wherein the playing begins at said particular place in said one of the content sequences and at said correlating places in the other content sequences.

34. A computer-readable storage medium as recited in claim 32, wherein said particular one of the content sequences comprises a plurality of index entries.

35. A computer-readable storage medium as recited in claim 32, wherein at least one of said other content sequences is a video stream.

36. A computer-readable storage medium as recited in claim 32, wherein:
said particular one of the content sequences comprises a plurality of index entries;
at least one of said other content sequences is a video stream;
at least one of said other content sequences is a textual transcript corresponding to the video stream.

37. A method of recording and reviewing a meeting, comprising the following steps:
recording the meeting as an audio/video sequence;
transcribing a textual transcript of the meeting;
creating index entries relating to the meeting;
time-correlating the audio/video sequence, the textual transcript, and the index entries with each other;
simultaneously displaying static portions of the audio/video sequence, the textual transcript, and the index entries, each static portion being displayed in a different display region, each static portion displayed being time-correlated with the other static portions displayed;
in response to user selection of a particular place in the textual transcript or the index entries, displaying time-correlating places in the audio/video sequence, the textual transcript, and the index entries; and
sequentially playing the audio/video sequence, the textual transcript, and the index entries from the place selected in the textual transcript or the index entries.

38. A method as recited in claim 37, further comprising the following additional step:
in response to a user command, playing the audio/video sequence, the textual transcript, and the index entries in time with each other.

39. A method as recited in claim 37, further comprising the following additional step:
in response to a user command, playing the audio/video sequence, the textual transcript, and the index entries in time with each other, wherein the playing begins at said particular place in the textual transcript or the index entries.

40. A method as recited in claim 37, wherein the step of creating index entries comprises capturing annotations made by meeting participants.

41. A method as recited in claim 37, wherein the step of creating index entries comprises capturing textual annotations made by meeting participants.

* * * * *

UNITED STATES PATENT AND TRADEMARK OFFICE
CERTIFICATE OF CORRECTION

PATENT NO : 6,148,304
DATED : Nov. 14, 2000
INVENTOR(S) : Pierre de Vries et al.

It is certified that error appears in the above-identified patent and that said Letters Patent are hereby corrected as shown below:

Column 9, line 28, change "sequence, displacing" to --sequences, displaying--.

Column 9, line 30, change "sequence" to "sequences".

Signed and Sealed this

Twenty-ninth Day of May, 2001

*Attest:*

NICHOLAS P. GODICI

*Attesting Officer*  *Acting Director of the United States Patent and Trademark Office*